E. D. Fink,
Cage Trap,
Nº 19,355. Patented Feb. 16, 1858.
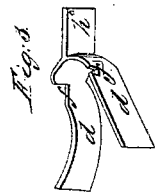
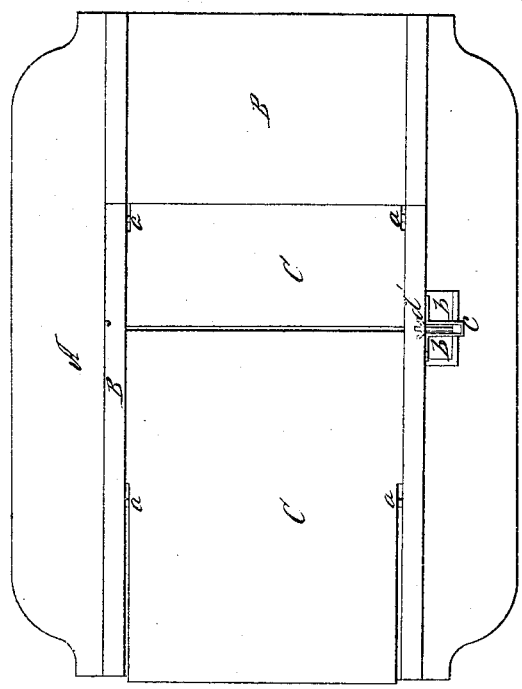
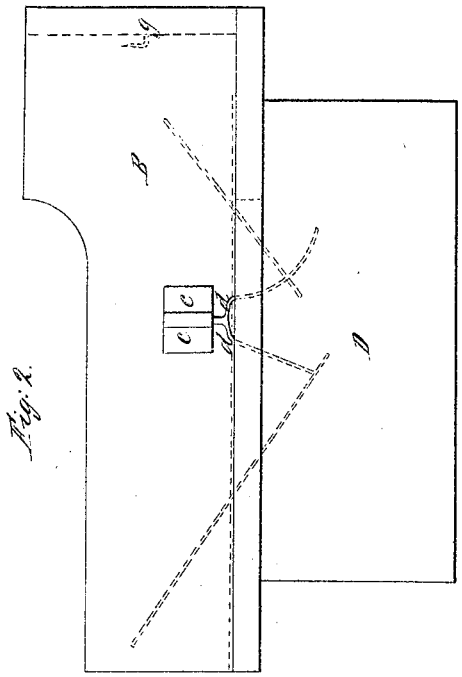

UNITED STATES PATENT OFFICE.

EARL D. FINK, OF COLUMBUS, OHIO.

TRAP FOR CATCHING RATS AND OTHER ANIMALS.

Specification of Letters Patent No. 19,355, dated February 16, 1858.

*To all whom it may concern:*

Be it known that I, EARL D. FINK, of Columbus, county of Franklin, and State of Ohio, have invented a new and Improved Trap for Rats, &c.; and I do hereby declare that the following is a full and exact description thereof, reference being had to the accompanying drawings, and to letters of reference marked thereon, in which—

Figure 1 is a plan view. Fig. 2 is a side elevation, Fig. 3 a section of the trigger shown detached.

To enable others skilled in the art to make and use my invention, I will proceed to describe its construction and operation. In the construction I use any known material used for such purposes.

In Fig. 1, A, the top of the box or cistern into which the rats or other things taken in the trap fall; B the sides and top of the guides leading on to the trap; C the trap floor composed of two pieces of tin or any other suitable material for such purposes; $a$, the bearings for the shaft attached to the floor of the trap to turn on; $b$, the pivot which vibrates on a point, or points at $d'$, shown in dotted lines; $c$ the tin guard for protecting the pivot for holding the trap floors.

In Fig. 2, B, the side of the guard; D the cistern or pit into which the rats, &c., are precipitated from the trap floors; $c$ the guard of tin for protecting the pivot, $d$, the pivot the extended sides of which are shown in dotted lines; $g$ the spike or hook to which the bait is attached. The floors of the trap are shown in dotted lines, set to receive the rats, &c., and also open to let the same fall into the pit or cistern.

In Fig. 3, $d$, the two arms of the pivot; $f, f$ the notches for catching and holding up the floor of the trap; $h$, the hole in the pivot, $d$, through which the pin passes to fasten it to the side of the guard.

In the operation of my invention, it having been constructed as described, the guard or sides B form three sides of a box to guide the rats, &c., onto the trap. The pivot catch, $d$, is hung on the pivot rod or staple $d'$, seen in Fig. 1, on which it vibrates laterally, but when the box is set level will always hang perpendicular by means of its own weight. The trap floors $c$ being hung on a shaft with bearings at $a$, and they are so arranged that by means of their own weight that they are always self acting. In the pivot catch, $d$ there are two slots or catches, $f$, one of which is cut square into the front arm, and the other beveled on the lower side when the trap is set (which it does of itself) the front floor catches into the square catch, and will bear the weight of the rat or whatever else may pass on it, but so soon as it steps, or jumps on to the rear floor, it gives way and as it descends, it operates against the cam, or beveled side of the rear arm of the pivot catch, thus pushing it laterally from its vertical position and thereby disengaging the front floor when both floors assume the position, as seen in dotted lines in Fig. 2. When the rat or other animal is precipitated into the cistern or box below the trap, as soon as the floors of the trap are relieved of their weight they directly assume their horizontal position, as also seen in same figure, when the trap is again set.

It will be seen that by means of the cam or beveled rear arm of pivot catch $d$, the floors cannot be made to afford any assistance to the rat in jumping out, for as long as the rear floor plate is held down the front floor plate is hung on a pivot and if it were jumped on by a rat, it would immediately yield and let it fall back again into the pit or cistern, so that it is impossible for escape from the pit if once in it. It will further be seen that by my arrangement the bait is always beyond the trap, and it serves only to decoy the rats, it being impossible for them even to get to it, which is a matter of great importance in traps, as the same bait will last until it is dried up or wasted by the effect of the atmosphere, and there is no necessity of baiting every time rats or other animals are caught in the trap which is the case with all of the traps in use. In this particular my trap is a great improvement over all others.

What I claim as new and desire to secure by Letters Patents is:

The pivot catch, or trigger with arms $d$, with square and beveled slots or catches $f$, for supporting, and disengaging the floors C, operating as described, and for the purposes set forth.

EARL D. FINK.

Witnesses:
F. G. CLAYTON,
JOS. C. CLAYTON.